United States Patent Office 2,836,578
Patented May 27, 1958

2,836,578
METHOD FOR POLYMERIZING AND SULFONATING VINYLIDENE AROMATIC COMPOUNDS

Arthur S. Teot, Midland, Mich., assignor to The Dow Chemical Company, Midland, Mich., a corporation of Delaware No Drawing. Application July 20, 1953
Serial No. 369,229

13 Claims. (Cl. 260—49)

This invention concerns a method and agents for concurrently polymerizing and sulfonating a vinylidene aromatic compound to form a water-soluble sulfonated polymeric product.

It has now been found that a monomeric polymerizable vinylidene aromatic compound of the benzene series can readily be concurrently polymerized and sulfonated by reacting the vinylidene aromatic compound with sulfur trioxide in a liquid reaction medium composed of at least one lower aliphatic polychlorinated hydrocarbon, as hereinafter defined, at a reaction temperature within the range of from —70° to 0° C. to form sulfonated polymeric products that are soluble in water.

Any vinylidene aromatic compound having the general formula:

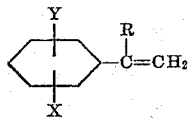

wherein one of the symbols X and Y represents a member of the group consisting of hydrogen, chlorine, a lower alkyl radical containing from 1 to 3 carbon atoms and an alkoxy radical containing from 1 to 3 carbon atoms, and the other represents a member of the group consisting of hydrogen and a lower alkyl radical containing from 1 to 3 carbon atoms, and R is selected from the group consisting of hydrogen and the methyl radical, may be used in the process.

Examples of suitable vinylidene aromatic compounds are styrene, ortho-, meta-, and para-vinyltoluene, vinylxylenes, ar-ethylvinylbenzene, ar-isopropylstyrene, chlorostyrene, ethoxystyrene, alpha-methylstyrene, para-methyl-alpha-methylstyrene, ar-chloro-alpha-methylstyrene, ar-ethyl-vinyltoluene, ar-chloro-vinyltoluene, or ar-diethylstyrene. Mixtures of any two or more of the vinylidene aromatic compounds, or of one or more of such vinylidene aromatic compounds and a minor proportion, i. e. 50 percent by weight or less, of divinylbenzene, may also be used.

The term "vinylidene aromatic compound" as used herein pertains to monoalkenyl aromatic compounds having the above formula and mixtures of such compounds with one another, including mixtures of a major proportion of one or more of such compounds and from 1 to 50 percent by weight of divinylbenzene.

Sulfur trioxide is employed as the polymerizing and sulfonating agent. The sulfur trioxide should be diluted with an inert liquid or gas such as nitrogen, or a polychlorinated hydrocarbon solvent. The sulfur trioxide is preferably employed as a solution dissolved in a polychlorinated hydrocarbon solvent such as carbon tetrachloride, perchloroethylene, or methylene chloride, and in concentration corresponding to from 2 to 15 percent by weight of the solution. The sulfur trioxide is employed in amount corresponding to from 3 to 5 moles of the sulfur trioxide per mole of the monomeric vinylidene aromatic compound used.

The reaction, which occurs readily at temperatures within the range of from —70° to 0° C., is carried out in a liquid reaction medium composed of at least one aliphatic polychlorohydrocarbon which is a member of the group consisting of carbon tetrachloride, chloroform, methylene chloride, 1,1,2-trichloroethane, tetrachloroethane and perchloroethylene.

Mixtures of any two or more of the chlorohydrocarbons may also be used. The chlorohydrocarbon is usually employed in amount sufficient to form a solution containing from 2 to 20 percent by weight of the monomeric vinylidene aromatic compound, although somewhat greater or lesser amounts of the liquid chlorohydrocarbon may be used.

In practice, the monomeric vinylidene aromatic compound is mixed with the aliphatic chlorohydrocarbon in the desired proportion. The liquid mixture is cooled to a temperature within the range of from —70° to 0° C., preferably from —50° to —20° C., and is agitated. Thereafter, the sulfur trioxide, dissolved in carbon tetrachloride, perchloroethylene, or methylene chloride, or a gaseous mixture of $SO_3$ and $N_2$, suitably in amount of 10 percent by weight, or less, of the solution is added while stirring and maintaining the reaction mixture at a temperature below 0° C. The reaction occurs rapidly with separation of the product as a precipitate. The reaction is usually complete within a few minutes after addition of the sulfur trioxide, although the mixture may be maintained at a reaction temperature for long periods of time. The reaction mixture is maintained cold and is neutralized, suitably by the addition of ammonia, or a concentrated aqueous solution of an alkali, e. g. a 30 to 50 weight percent solution of sodium hydroxide, or potassium hydroxide, to the mixture at a temperature below 0° C. The product is separated from the liquid by filtering and is dried. The product is usually obtained as a free-flowing powder.

The following examples illustrate ways in which the principle of the invention has been applied, but are not to be construed as limiting in scope.

Example 1

A charge of 5.2 grams of styrene was dissolved in 260 grams of a mixture of equal parts by weight of chloroform and carbon tetrachloride. The solution was cooled to a temperature of —50° C. and vigorously stirred. A cold solution of 12 grams of sulfur trioxide dissolved in 120 grams of carbon tetrachloride was added. The resulting mixture was vigorously stirred and maintained at a temperature between —50° to —14° C. for three minutes. A bright yellow precipitate was obtained. The mixture was stirred and was neutralized by introducing anhydrous ammonia into the liquid at a temperature below —14° C. The precipitate was separated from the liquid by filtering and was dried by heating in an air oven at a temperature of 65° C. for approximately 16 hours. The product, a mixture of polystyrene acid sulfonate and its ammonium salt, together with ammonium sulfate, was a light gray powder. It was soluble in water. An aqueous solution containing 5 percent by weight of the product had a pH value of 2.8. The product contained 17 percent by weight of organic sulfur and 3 percent of inorganic sulfur. Total sulfur was 20 percent by weight.

Example 2

A solution of 5.2 grams of styrene, 130 grams of chloroform and 130 grams of carbon tetrachloride was cooled to a temperature of —70° C., and vigorously agitated. A solution of 12 grams of sulfur trioxide dissolved in 120 grams of carbon tetrachloride was slowly added while maintaining the reaction mixture at a temperature between —70° and —65° C. An insoluble precipitate was obtained. The cold reaction mixture was neutralized with anhydrous ammonia. The precipitate was separated by filtering and was dried. The product was a white powder. It was soluble in water.

*Example 3*

A solution of 5.2 grams of styrene and 240 grams of carbon tetrachloride was cooled to —25° C. and placed in a dropping funnel. Twelve grams of sulfur trioxide was dissolved in 240 grams of cold carbon tetrachloride. The solutions were mixed by slowly and concurrently adding the same to 100 grams of vigorously agitated carbon tetrachloride while maintaining the reaction mixture at a temperature between 0° and —20° C. A brown precipitate was obtained. The reaction mixture was neutralized by adding ammonia to the liquid at a temperature below 0° C. The product was separated by filtering and was dried. The product was a powdery free-flowing resin. It was soluble in water.

*Example 4*

A charge of 5.9 grams of a mixture of approximately 70 percent by weight of meta-vinyltoluene and 30 percent para-vinyltoluene was dissolved in 295 grams of a mixture of equal parts by weight of chloroform and carbon tetrachloride. The solution was cooled to —50° C. and was vigorously agitated. Twelve grams of sulfur trioxide dissolved in 120 grams of carbon tetrachloride was added slowly while maintaining the reaction mixture at a temperature between —50° and —15° C. An insoluble precipitate was obtained. The reaction mixture was neutralized with anhydrous ammonia at a temperature below —15° C. The precipitate was separated by filtering and was dried. The produce was a powdery resin. It was soluble in water. An aqueous solution containing 5 percent by weight of the product had a pH value of 2.3.

*Example 5*

A solution of 7.9 grams of ar-ethoxystyrene and 395 grams of a mixture of equal parts by weight of chloroform and carbon tetrachloride was cooled to a temperature of —50° C., and was vigorously agitated. A solution of 12 grams of sulfur trioxide dissolved in 120 grams of carbon tetrachloride was added, while maintaining the reaction mixture at a temperature between —50° and —16° C. An insoluble precipitate was obtained. The cold reaction mixture was neutralized with anhydrous ammonia. The precipitate was separated by filtering and was dried. The product was a white powder. It was soluble in water. An aqueous solution containing 5 percent by weight of said product had a pH value of 3, and a Brookfield viscosity of 2 centipoises at 25° C.

*Example 6*

A charge of 6.55 grams of a mixture of 50 percent by weight of ar-ethylvinylbenzenes and 50 percent of divinylbenzenes (approximately 65 percent meta-isomers and 35 percent para-isomers) was dissolved in 260 grams of a mixture of equal parts by weight of chloroform and carbon tetrachloride. The solution was cooled to a temperature of —50° C., and was vigorously agitated. A solution of 12 grams of sulfur trioxide dissolved in 120 grams of carbon tetrachloride was added portionwise, while maintaining the reaction mixture at a temperature between —50° C. and —40° C. An insoluble precipitate was obtained. The cold reaction mixture was neutralized with ammonia gas. The precipitate was separated by filtering and was dried. The product was a free-flowing powder. It was soluble in water.

*Example 7*

A solution of 5.9 grams of alpha-methylstyrene and 294 grams of a mixture of equal parts by weight of chloroform and carbon tetrachloride was cooled to a temperature of —50° C., and was vigorously agitated. Twelve grams of sulfur trioxide dissolved in 120 grams of carbon tetrachloride was added while maintaining the reaction mixture at a temperature between —50° and —40° C. A precipitate was obtained. The reaction mixture was neutralized with ammonia gas, while cold. The precipitate was separated by filtering and was dried. The product was a brown powder. It was soluble in water.

*Example 8*

A mixture of 5.2 grams of styrene and 260 grams of methylene chloride was cooled to a temperature of —50° C. and stirred. A solution of 12 grams of sulfur trioxide dissolved in 120 grams of cold carbon tetrachloride was added. The temperature rose from —50° to —21° C. A precipitate was obtained. The mixture was stirred and neutralized with ammonia gas at a temperature below —20° C. The precipitate was separated by filtering and was dried. The product was a free-flowing powder. It was soluble in water. An aqueous solution containing 5 percent by weight of the product had a Brookfield viscosity of 4 centipoises at 25° C.

I claim:

1. A method of making a water-soluble sulfonated polymeric composition, which comprises feeding a solution of sulfur trioxide in an inert diluent into admixture with a monomeric vinylidene aromatic compound dissolved in a liquid reaction medium composed of at least one aliphatic polychlorohydrocarbon selected from the group consisting of carbon tetrachloride, chloroform, methylene chloride, 1,1,2-trichloroethane, tetrachloroethane and perchloroethylene, at a reaction temperature between —70° and 0° C. in proportions corresponding to from 3 to 5 moles of the sulfur trioxide per mole of the vinylidene aromatic compound and subjecting the mixture to said reaction temperature with resultant formation of an insoluble sulfonated polymeric product, then neutralizing the reaction mixture with an alkali selected from the group consisting of ammonia, sodium hydroxide and potassium hydroxide at a temperature below 0° C. and separating the product from the mixture.

2. A method of making a water-soluble sulfonated polymeric composition, which comprises feeding a solution of sulfur trioxide dissolved in a liquid solvent which is a member of the group consisting of carbon tetrachloride, perchloroethylene and methylene chloride, into admixture with a monomeric vinylidene aromatic compound dissolved in a liquid reaction medium composed of at least one aliphatic polychlorohydrocarbon selected from the group consisting of carbon tetrachloride, chloroform, methylene chloride, 1,1,2-trichloroethane, tetrachloroethane and perchloroethylene, at a reaction temperature between —70° and 0° C. in proportions corresponding to from 3 to 5 moles of the sulfur trioxide per mole of the vinylidene aromatic compound and subjecting the mixture to said reaction temperature with resultant formation of an insoluble sulfonated polymeric product, then neutralizing the reaction mixture with an alkali selected from the group consisting of ammonia, sodium hydroxide and potassium hydroxide, at a temperature below 0° C. and separating the product from the mixture.

3. A method for making a water-soluble sulfonated polymeric composition, as described in claim 2, wherein the vinylidene aromatic compound is styrene.

4. A method for making a water-soluble sulfonated polymeric composition as described in claim 2, wherein the vinylidene aromatic compound is vinyltoluene.

5. A method for making a water-soluble sulfonated polymeric composition as described in claim 2, wherein the vinylidene aromatic compound is ethoxystyrene.

6. A process as described in claim 2 wherein the reaction is carried out at a temperature within the range of from —50° to —20° C.

7. A process as described in claim 6, wherein the reaction mixture is neutralized with ammonia at a temperature between —50° and —20° C. prior to separating the product from the liquid.

8. A method of making a water-soluble sulfonated polymeric composition, which comprises feeding a solution of sulfur trioxide dissolved in a liquid solvent which is a member of the group consisting of carbon tetrachloride, perchloroethylene and methylene chloride, in concentration of from 2 to 15 percent by weight of the solution, into admixture with a monomeric vinylidene aromatic compound dissolved in a liquid reaction medium composed of at least one aliphatic polychlorohydrocarbon selected from the group consisting of carbon tetrachloride, chloroform, methylene chloride, 1,1,2-trichloroethane, tetrachloroethane and perchloroethylene, in concentration of from 2 to 20 percent by weight of the solution at a reaction temperature within the range of from —70° to 0° C. and in proportions corresponding to from 3 to 5 moles of the sulfur trioxide per mole of the vinylidene aromatic compound, subjecting the resulting mixture to said reaction temperature with resultant formation of an insoluble sulfonated polymeric product, then neutralizing the reaction mixture with ammonia at a temperature below 0° C. and separating the product from the reaction mixture.

9. A process as described in claim 8, wherein the vinylidene aromatic compound is styrene.

10. A process as described in claim 8, wherein the vinylidene aromatic compound is vinyltoluene.

11. A process as described in claim 8, wherein the vinylidene aromatic compound is ethoxystyrene.

12. A process as described in claim 8, wherein the reaction is carried out at a temperature within the range of from —50° to —20° C.

13. A process as described in claim 8, wherein the vinylidene aromatic compound is alpha-methyl styrene and the reaction is carried out at a temperature within the range of from —50° to —20° C.

References Cited in the file of this patent

UNITED STATES PATENTS 2,469,472  Nachod _____ May 10, 1949

OTHER REFERENCES

Campaigne et al.: J. Am. Chem. Soc. 68, 880–882 (May 1946).

Boundy et al.: "Styrene," etc., page 118 (Reinhold 1952). Copy in Div. 50.